G. W. SWIFT, Jr.
METHOD OF MAKING OPEN FACE ENVELOPS.
APPLICATION FILED AUG. 4, 1915.
1,337,735.
Patented Apr. 20, 1920.
3 SHEETS—SHEET 2.
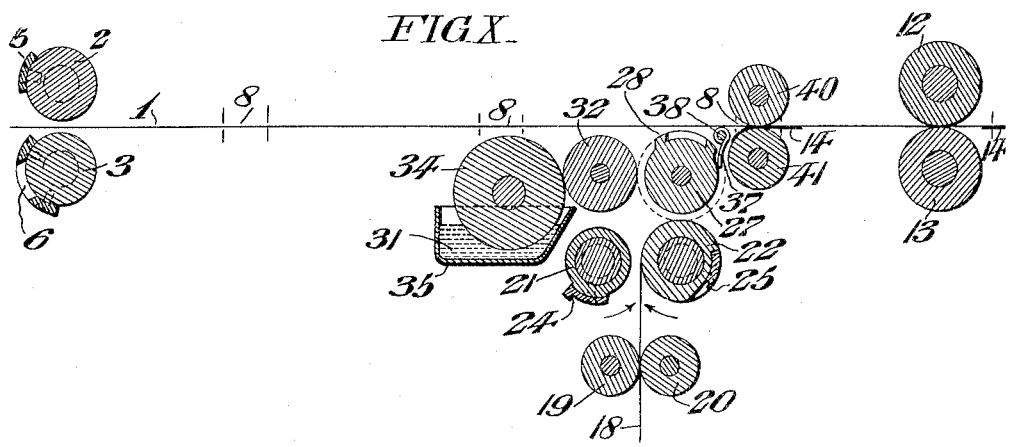
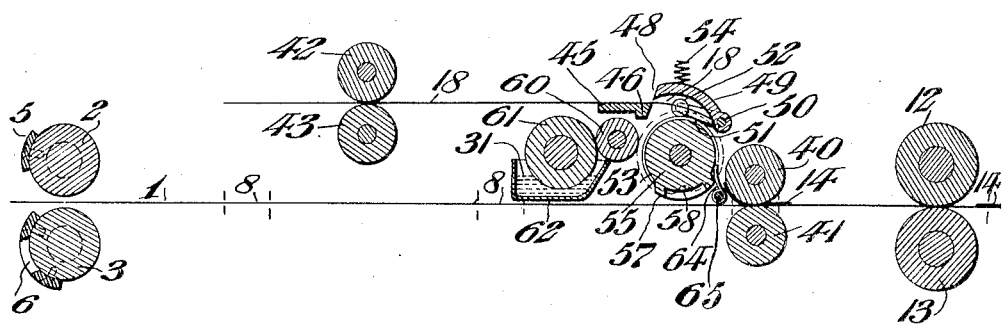

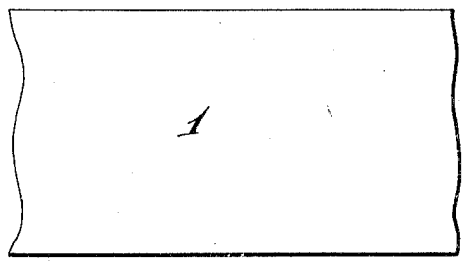
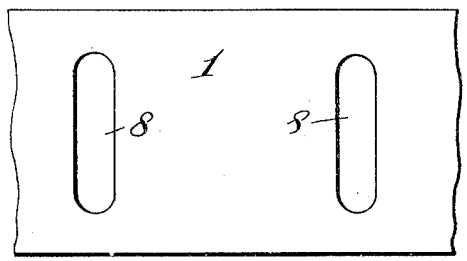
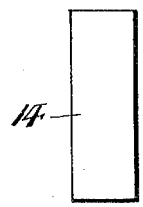
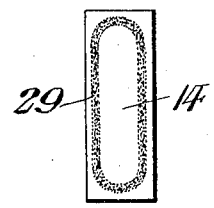
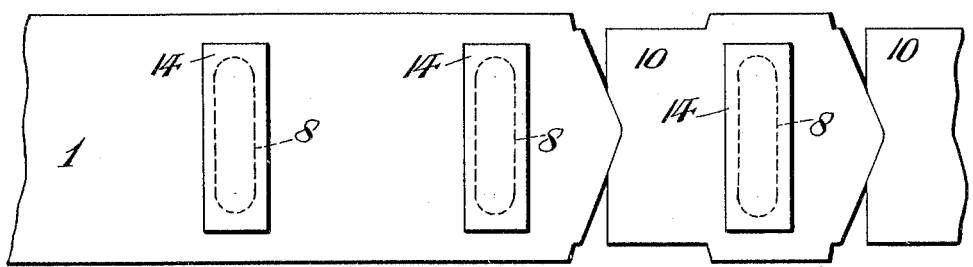
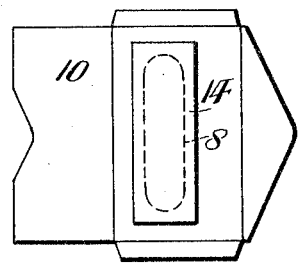
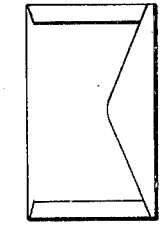
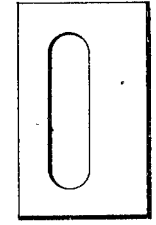
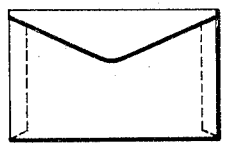

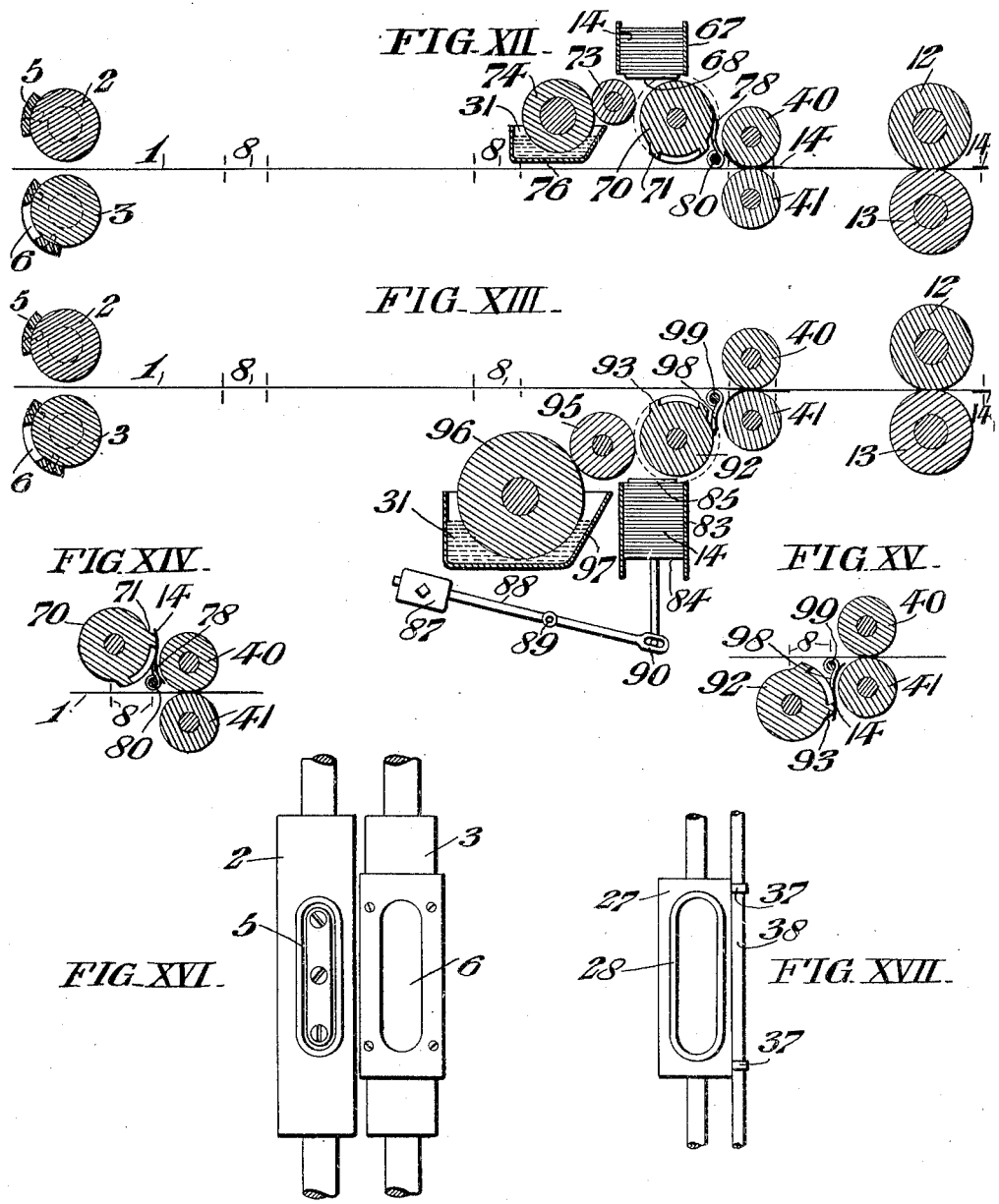

UNITED STATES PATENT OFFICE.

GEORGE W. SWIFT, JR., OF BORDENTOWN, NEW JERSEY.

METHOD OF MAKING OPEN-FACE ENVELOPS.

1,337,735.

Specification of Letters Patent.

Patented Apr. 20, 1920.

Application filed August 4, 1915. Serial No. 43,555.

*To all whom it may concern:*

Be it known that I, GEORGE W. SWIFT, Jr., residing at Bordentown, in the county of Burlington and State of New Jersey, have invented certain new and useful Improvements in Methods of Making Open-Face Envelops, whereof the following is a specification, reference being had to the accompanying drawings.

My invention relates to envelops of the class wherein the openings in the faces thereof, for display of the address, etc., are covered by patches of transparent material sealed thereon to prevent access to the contents of the envelops through said openings.

Ordinarily, the patches of transparent material are attached to the envelops by adhesive material applied directly to the envelop blanks or to the web from which they are formed. Such methods necessitate the use of adhesive material containing an abnormal amount of moisture, or the use of an excess of said material to avoid desiccation of the imprints before the patches can be applied thereto. In either case, the margins of the openings in the envelops are permanently distorted and discolored by the adhesive material thus applied to them.

The essential feature of my invention is that the adhesive material, instead of being applied to the envelop blanks, or the web from which they are formed, is directly printed upon the transparent material, and after the latter has been cut or otherwise formed in individual patches, each adapted to cover a single envelop opening. Said method has the advantages that the adhesive material is not exposed to drying until an instant preceding the application of each patch; and therefore, only the minimum amount of adhesive material is required; the envelop blanks are not distorted or discolored by excess of adhesive material; and the mechanism required in the ordinary methods aforesaid to prevent setting off the adhesive imprints from the envelop blanks upon the mechanism by which the latter are shaped, is dispensed with. For instance, in accordance with my method, a web of paper or other suitable fabric may be progressed at a uniform rate, while being punched at intervals with openings which are in such spaced relation that said web may be subsequently divided to form individual envelop blanks each including one of said openings, and patches of transparent material, each of such dimensions as to form a cover for a single envelop opening, may be presented adjacent said envelop web, successively provided with imprints of adhesive material and successively pressed upon said envelop web over the respective openings therein. As hereinafter described, said patches may be cut in succession from a web progressed at a slower rate than said envelop web, or, they may be formed in any convenient manner and presented in a stack from which they are progressed transversely to said envelop web, in either case, the operation of printing each patch with adhesive may be effected by rotary means which picks up each patch as it prints it and shifts it to the region of registry with the opening which it is to cover in said web. Said web may then be divided to form individual envelop blanks each including one of said openings covered with one of said adhesive patches, and said blanks folded to form envelops.

My invention includes the various novel features hereinafter more definitely specified and claimed.

In the drawings, Figure I, is a plan view of a web of paper or other suitable flexible fabric from which envelops may be formed.

Fig. II, is a plan view of said web with openings formed therein in such spaced relation as to appear in proper position in the envelop blanks subsequently formed therefrom.

Fig. III, is a plan view of a piece of transparent web cut to form an individual patch to cover one of the openings shown in Fig. II.

Fig. IV, is a plan view of said individual patch provided with an imprint of adhesive material.

Fig. V, is a plan view of said envelop web showing the transparent patches applied thereto and an envelop blank severed therefrom.

Fig. VI, is a plan view of an individual blank cut from the web shown in Fig. V, and creased where it is to be folded.

Fig. VII, is a rear view of an envelop formed from the blank shown in Fig. VI.

Fig. VIII, is a front view of said envelop shown in Fig. VII.

Fig. IX, is a rear view of an envelop, similar to that shown in Fig. VII, except that the end flaps are folded inside of the rear wall, instead of outside as in Fig. VII.

Fig. X, is a diagrammatic vertical sectional view of rotary mechanism for contemporaneously progressing and punching an envelop web, progressing a web of transparent material, cutting pieces therefrom to form individual patches, printing said patches with adhesive, and applying said adhesive patches in registry with the openings in said envelop web.

Fig. XI is a diagrammatic vertical sectional view of a modified form of the mechanism shown in Fig. X; wherein the cutting mechanism for the transparent web is oscillatory instead of rotary as in Fig. X.

Fig. XII, is a diagrammatic vertical sectional view of a modified form of mechanism for progressing and punching the envelop web, supplying cut patches of transparent material from a stack, printing them with adhesive material, and applying them upon the upper surface of said envelop web in registry with the openings therein.

Fig. XIII, is a diagrammatic vertical sectional view of mechanism similar to that shown in Fig. XII, except that it applies the patches to the under surface of the envelop web.

Fig. XIV, is a fragmentary vertical sectional view showing parts of the mechanism of Fig. XII, shifting an adhesive patch to the region of its attachment upon the envelop web.

Fig. XV, is a fragmentary vertical sectional view, similar to Fig. XIV, but showing parts of the mechanism of Fig. XIII, shifting an adhesive patch to the region of its attachment upon the envelop web.

Fig. XVI, is an elevation of a pair of envelop web punching rolls such as indicated at the left hand side of Figs. X, to XIII inclusive.

Fig. XVII, is an elevation of a roll, such as indicated in Figs. X to XIII, inclusive, for making imprints of adhesive on the transparent patches, and means for doffing them from said roll.

In making envelops from a continuous web, in accordance with my method, the primarily imperforate web 1, shown in Fig. I, is progressed relatively to the punching mechanism comprising the rolls 2, and 3, shown in Figs. X, to XIII, and XVI, respectively, provided with the male die 5, and female die 6, and punched therewith to form successive openings 8, therein as shown in Fig. II; said openings being in such spaced relation as to appear in respective individual envelop blanks 10, subsequently divided from said web 1, as indicated in Fig. V.

I find it convenient to progress said web 1, by frictional engagement thereof between the rolls 12, and 13, disposed with their axes in parallel relation respectively upon opposite sides of said web; said rolls being conveniently relatively spring-pressed toward each other so as to press the patches of transparent material 14, upon said web 1, as shown in Fig. V.

Said patches 14, which are all of the size shown in Fig. III, may be formed in any convenient manner. For instance, I have shown in Fig. X, rotary mechanism which, in addition to the elements aforesaid for manipulating the envelop web 1, includes means for forming such patches 14, from the web 18, which is progressed contemporaneously with said web 1, but at a slower rate, by and between the pair of feed rolls 19, and 20, which present said web 18, in plane form between the shear rolls 21, and 22, which respectively carry cutters 24, and 25, in such coöperative relation as to shear from said web 18, successive patches 14; one such patch being sheared from said web at each revolution of said rolls 21, and 22, in the direction of the arrows shown in Fig. X.

Said shear roll 22, also serves as a platen for the printing roll 27, which carries the type form 28, adapted to make imprints of adhesive material such as indicated at 29, in Fig. IV. Said type form 28, receives a coating of the adhesive material 31, from the transfer roller 32, which is in operative relation with the coating roller 34, which dips into a supply of said adhesive material in the tank 35.

The construction and arrangement above described is such that said rotary printing means, including the roll 27, and type form 28, picks up each patch 14, as it prints it against the platen face of said roller 22, and shifts it to the region of registry with the opening 8, which it is to cover in said web 1, as indicated in Fig. X; wherein one of said patches has just been doffed from the type form 28, by the resilient doffer blades 37, which are supported in proper relation with said roll 27, by the bar 38, as indicated in Fig. XVII. The forward edge of each of said patches 14, is caught between the rolls 40, and 41, as shown in Fig. X, and said patches are pressed upon the under surface of the web 1, in registry with the successive openings 8, therein, so as to cover said openings as indicated in Fig. V.

However, it is unnecessary that the cutting mechanism for the transparent web shall be of the rotary construction and arrangement shown in Fig. X. For instance, mechanism may be employed, as shown in Fig. XI, which in addition to the elements for progressing and punching the envelop web 1, with openings 8, as above described, includes a pair of feed rolls 42, and 43, which progress the transparent web 18, contemporaneously with the web 1, but at a slower rate, so as to present said web 18, in plane form over the cutting table 45. Said table 45, has the ledger blade 46, at the edge thereof disposed in shearing relation with the blade 48, carried by the curved platen 49, which is mounted to oscillate upon the shaft 50. Said shaft 50, has the arm 51, provided with the roller 52, arranged to coöperate with the cam 53, by which said platen and blade are normally upheld in the position shown in Fig. XI, against the pressure of the spring 54, which tends to thrust said platen toward the printing roller 55, which is like the printing roller 27, above described. Said printing roller 55, carries said cam 53, and also the type form 57, adapted to make imprints of adhesive such as indicated at 29, in Fig. IV. Said cam 53, has the notch 58, therein adapted to register with said roller 52, when said type form 57, is presented upwardly in printing position; so that said platen is then free to be pressed downwardly by said spring 54, to sever a piece 14, from the forward end of said transparent web 18, by the operation of said shear blades 46, and 48, and to press the severed patch 14, upon said type form 57, to receive the imprint of adhesive 31, which said form receives from the transfer roller 60, which is in operative relation with the coating roller 61, which dips into a supply of said adhesive material in the tank 62.

The construction and arrangement shown in Fig. XI, is such that said rotary printing means, including the roller 55, and type form 57, picks up each patch 14, as it prints it, and shifts it to the region of registry with the opening 8, which it is to cover in said web 1, as indicated in Fig. V; said patch being doffed from the type form 57, by the resilient doffer blades 64, which are supported in proper relation with said roller 55, by the bar 65. The forward edge of each of said patches is caught between the rolls 40, and 41, as shown in Fig. XI, and thereby pressed upon the upper surface of the web 1, in registry with the successive openings 8, therein, so as to cover said openings as indicated in Fig. V.

However, it is unnecessary to form said patches 14, one at a time, as above described. For instance, a series of such patches cut to the form shown in Fig. III, by any convenient means, may be stacked in the holder 67, shown in Fig. XII, above the envelop web 1, in which they are temporarily retained by the opposite overlapping end flanges 68, in said holder, in which they gravitate toward rotary means for successively providing them with imprints of adhesive material and shifting them to the region of registry with the openings 8, which they are to cover in said web 1. Such means include the roll 70, which is like the rolls 27, and 55, above described, and carries the type form 71, adapted to form imprints of adhesive material such as indicated at 29, in Fig. IV. Said type form 71, receives a coating of the adhesive material 31, from the transfer roller 73, which is in operative relation with the coating roller 74, which dips into a supply of said adhesive material in the tank 76.

The construction and arrangement shown in Fig. XII, is such that said rotary printing means picks up each patch 14, as it prints it, and shifts it to the region of registry with the opening 8, which it is to cover in said web 1, as indicated in Fig. XIV; wherein one of said patches is being doffed from the type form 71, by the resilient doffer blades 78, which are supported in proper relation with said roll 70, by the bar 80. The forward edge of each of said patches 14, is caught between the rolls 40, and 41, as shown in Fig. XII, and thereby pressed upon the upper surface of the web 1, in registry with the successive openings 8, therein, so as to cover said openings as indicated in Fig. V.

In the mechanism shown in Fig. XII, the blank transparent patches 14, gravitate in the holder 67, so as to frictionally engage the bottom patch in the stack upon the flanges 68, at the opposite ends of said holder and, although such pressure of the stack of patches upon the bottom one thereof may be minimized by making the holder slightly narrower than the width of the patches, or corrugating the side walls of the holder, so that the patches frictionally engage the holder at their edges; I find it convenient to present a stack of such patches to the printing device, by means with which the frictional engagement of each patch in the stack may be precisely regulated to facilitate the operation of shifting the patches in succession from the stack by means of adhesive engagement with the printing device. Such construction and arrangement is shown in Fig. XIII which, in addition to the mechanism for progressing and punching the envelop web 1, as above described, includes the stationary holder 83, for the stack of blank transparent patches 14, which is supported by the reciprocatory plunger 84, so as to present the top patch in the stack against the opposite end flanges 85, in said holder 83, with a pressure which is precisely predetermined and regulated by adjustment of the counterbalance weight 87, on the lever 88, which is fulcrumed at 89, and pivotally connected at 90, with said plunger 84. Said patches 14, in the stack holder 83, are adapted to be successively printed, picked up and shifted to the region of their registry with the openings 8, in said web 1, by means of the roll 92, which is like the rolls 27, 55 and 70, above described and carries the type form 93, adapted to form imprints of adhesive material such as indicated at 29, in Fig. IV. Said type form 93, receives a coating of adhesive material 31, from the transfer roller 95, which is in operative relation with the coating roller 96, which dips into a supply of said adhesive material in the tank 97.

Said rotary printing means including the roll 92, shown in Fig. XIII, picks up each patch 14, at it prints it and shifts it to the region of registry with the opening 8, which it is to cover in said web 1, as indicated in Fig. XV, wherein one of said patches is being doffed from the type form 93, by the resilient doffer blades 98, which are supported in proper relation with said roll 92, by the bar 99. The forward edge of each of said patches is caught between the rolls 40, and 41, as shown in Fig. XIII and thereby pressed upon the under surface of the web 1, in registry with the successive openings 8, therein, so as to cover said openings as indicated in Fig. V.

Although I have illustrated my invention with reference to a method, whereby the adhesive patches of transparent material are applied to cover openings in an envelop web before the latter is divided to form the respective envelop blanks, I do not desire to limit myself to such procedure, as the essential feature of my invention, to wit: the application of adhesive material directly to the transparent fabric after the latter has been cut or otherwise formed in individual patches, each adapted to cover a single envelop opening, may be utilized in applying such patches to the envelop web after the latter has been divided to form independent individual envelop blanks.

Therefore, I do not desire to limit myself to the specific details of the procedure herein set forth, as it is obvious that various modifications may be made therein without departing from the essential features of my invention as defined in the appended claims.

Having thus described my invention, I claim:

1. The method of making open face envelops which consists in progressing a web at a uniform rate while forming a series of openings therein, in such spaced relation that said web may be subsequently divided to form individual envelop blanks each including one of said openings; providing separate individual patches to cover the openings in said envelop web; providing each of said separate individual patches with an imprint of adhesive material; successively presenting said adhesive patches adjacent said envelop web; successively pressing said adhesive patches upon the envelop web in registry with the openings therein; dividing said envelop web to form respective individual envelop blanks each including one of said openings, covered by one of said patches; and folding said blanks to form envelops.

2. The method of making open face envelops which consists in progressing a web at a uniform rate while forming a series of openings therein in such spaced relation that said web may be subsequently divided to form individual envelop blanks, each including one of said openings; providing separate individual patches to cover the openings in said envelop web; providing each of said separate individual patches with an imprint of adhesive material; presenting said adhesive patches adjacent said envelop web; pressing said adhesive patches upon the envelop web in registry with the openings therein; dividing said envelop web to form respective individual envelop blanks each including one of said openings, covered by one of said patches; and folding said blanks to form envelops.

3. The method of making open face envelops which consists in progressing a web from which envelop blanks are to be formed; punching said web at intervals to form openings through which the addresses upon letters inclosed in the envelops may be seen; progressing a web of transparent material at a slower rate than said envelop web; cutting pieces from said transparent web, each adapted to form a cover patch for an opening in said envelop web; providing said separate patches with imprints of adhesive material; attaching said adhesive patches to said envelop web in registry with the openings therein; and severing said envelop web to form individual envelop blanks.

4. The method of making open face envelops which consists in progressing a web from which envelop blanks are to be formed; punching said web at intervals to form openings through which the addresses upon letters inclosed in the envelops may be seen; progressing a web of transparent material; cutting pieces from said transparent web, each adapted to form a cover patch for an opening in said envelop web; providing said separate patches with imprints of adhesive material; attaching said adhesive patches to said envelop web in registry with the openings therein; and severing said envelop web to form individual envelop blanks.

5. The method of making open face envelops, which consists in progressing a web from which envelop blanks are to be formed; punching said web at intervals to form openings through which the addresses upon letters inclosed in the envelops may be seen; forming separate individual patches of transparent material each adapted to cover one of the openings in said envelop web; progressing said patches at right angles to the direction of progression of said envelop web; providing each of said patches with an imprint of adhesive material; attaching said adhesive patches upon said envelop web in registry with the openings therein; and dividing said envelop web to form individual envelop blanks each including one of said openings, covered by one of said patches.

6. The method of making open face envelops which consists in progressing at a uniform rate a web having a series of openings therein, in such spaced relation that said web may be subsequently divided to form individual envelop blanks each including one of said openings; providing separate individual patches to cover the openings in said envelop web; providing each of said separate individual patches with an imprint of adhesive material; successively presenting said adhesive patches adjacent said envelop web; successively pressing said adhesive patches upon the envelop web in registry with the openings therein; dividing said envelop web to form respective individual envelop blanks each including one of said openings, covered by one of said patches; and folding said blanks to form envelops.

7. The method of making open face envelops which consists in progressing at a uniform rate a web having a series of openings therein in such spaced relation that said web may be subsequently divided to form individual envelop blanks, each including one of said openings; providing separate individual patches to cover the openings in said envelop web; providing each of said separate individual patches with an imprint of adhesive material; presenting said adhesive patches adjacent said envelop web; pressing said adhesive patches upon the envelop web in registry with the openings therein; dividing said envelop web to form respective individual envelop blanks each including one of said openings, covered by one of said patches; and folding said blanks to form envelops.

8. The method of making open face envelops which consists in progressing a web from which envelop blanks are to be formed; said web having openings through which the addresses upon letters inclosed in the envelops may be seen; progressing a web of transparent material at a slower rate than said envelop web; cutting pieces from said transparent web, each adapted to form a cover patch for an opening in said envelop web; providing said separate patches with imprints of adhesive material; attaching said adhesive patches to said envelop web in registry with the openings therein; and severing said envelop web to form individual envelop blanks.

In testimony whereof I have hereunto signed my name, at Philadelphia, Pennsylvania, this third day of August, 1915.

GEORGE W. SWIFT, Jr.

Witnesses:
JAMES H. BELL,
A. REID.